United States Patent [19]

deBruin

[11] Patent Number: 4,872,707

[45] **Date of Patent: * Oct. 10, 1989**

[54] LABEL OR TICKET

[75] Inventor: Frank G. deBruin, Grand Rapids, Mich.

[73] Assignee: Grand Rapids Label Company, Grand Rapids, Mich.

[ * ] Notice: The portion of the term of this patent subsequent to Feb. 9, 2005 has been disclaimed.

[21] Appl. No.: 121,606

[22] Filed: Nov. 17, 1987

Related U.S. Application Data

[63] Continuation of Ser. No. 588,047, Mar. 9, 1984, Pat. No. 4,724,166.

[51] Int. Cl.[4] ...................... B42D 15/00; B32B 31/00; B05D 1/32; D06N 7/04

[52] U.S. Cl. .................................... 283/102; 283/111; 283/903; 156/247; 156/344; 427/259; 428/142

[58] Field of Search ..................... 428/40, 41, 42, 202, 428/914, 352, 43, 142, 144, 147, 148, 916; 40/2 R, 360, 594, 611, 615; 434/408; 283/81, 101, 49, 50, 901, 903, 94, 100, 102, 110, 111; 427/154, 155, 259, 272, 282, 340; 156/230, 240, 289, 277, 247, 344

[56] References Cited

U.S. PATENT DOCUMENTS

| | | | |
|---|---|---|---|
| Re. 30,573 | 9/1981 | Ichinose | 428/202 |
| Re. 30,958 | 6/1882 | White | 428/42 |
| 814,592 | 3/1905 | Duane | 283/81 |
| 1,004,055 | 9/1911 | Martin et al. | 283/81 |
| 2,216,289 | 10/1940 | Asnes | 428/42 |
| 2,859,051 | 11/1958 | Simpson | 40/2 R |
| 3,211,470 | 10/1965 | Wilson | 283/94 |
| 3,252,234 | 5/1966 | Goodman | 428/40 |
| 3,312,005 | 4/1967 | McElroy | 428/40 |
| 3,411,978 | 11/1968 | Frohbach et al. | 156/240 |
| 3,420,364 | 1/1969 | Kennedy, Jr. | 156/230 |
| 3,494,059 | 2/1970 | Minasian | 428/40 |
| 3,524,271 | 8/1970 | Buske | 40/2 R |
| 3,524,782 | 8/1970 | Buske | 156/249 |
| 3,549,482 | 12/1970 | Okutani | 428/40 |
| 3,554,835 | 1/1971 | Morgan | 156/289 |
| 3,749,593 | 7/1973 | Keiser | 156/289 |
| 3,829,133 | 8/1974 | Smagala-Romanoff | 428/916 |
| 3,889,407 | 6/1975 | Elzer | 40/2 R |
| 3,914,383 | 10/1975 | Stipek, Jr. | 40/2 R |
| 3,967,022 | 6/1976 | Hasei | 40/2 R |
| 3,985,602 | 10/1976 | Stuart | 428/202 |
| 4,055,249 | 10/1977 | Kojima | 428/42 |
| 4,060,168 | 7/1977 | Romagnoli | 428/40 |
| 4,115,174 | 9/1978 | Bauer | 156/249 |
| 4,204,707 | 5/1980 | Blum et al. | 283/102 |
| 4,241,943 | 12/1980 | Malinovitz | 283/102 |
| 4,270,665 | 1/1981 | Kunimoto et al. | 428/202 |
| 4,281,762 | 8/1981 | Hattemer | 428/42 |
| 4,306,367 | 12/1981 | Otto | 40/2 R |
| 4,359,358 | 11/1982 | Hattemer | 156/344 |
| 4,391,853 | 7/1983 | Pointon | 156/249 |
| 4,394,904 | 7/1983 | Larimore | 428/40 |
| 4,398,985 | 8/1983 | Eagon | 156/233 |
| 4,429,877 | 2/1984 | Coppock | 283/102 |
| 4,544,590 | 10/1985 | Eagon | 156/233 |
| 4,724,166 | 2/1988 | deBruin | 428/202 |

FOREIGN PATENT DOCUMENTS

| | | | |
|---|---|---|---|
| 2075918 | 4/1980 | United Kingdom | 283/102 |

*Primary Examiner*—Michael W. Ball
*Assistant Examiner*—Louis Falasco

[57] ABSTRACT

Label assemblies for redeemable coupons, pressure-sensitive labels, lottery tickets and the like. A strip of redeemable coupons comprises an indefinite length web coated with a release coating, at least one coupon on the web comprising a sheet of stock material, a first dry coating layer covering the surface of the stock material, a second dry coating covering the first dry coating and a pressure-sensitive adhesive layer over the second dry coating and adhesively securing the coupons to the web. The first and second dry coating layers are substantially incompatible so that they separate from one another when the coupon, applied to an uncoated surface, is pulled therefrom. The first and second layers have shear and tensile strength therebetween greater than the tensile strength between the pressure-sensitive layer and the web so that the coupons can be first separated from the backing web and then applied to articles, and thereafter removed from the articles, leaving the adhesive layer and the second dry coating layer on the container. Lottery tickets having two incompatible layers, one of which is a pigmented layer, are also disclosed.

8 Claims, 2 Drawing Sheets

LABEL OR TICKET

This is a continuation of application Ser. No. 588,047 filed Mar. 9,1987 now U.S. Pat. No. 4,724.166.

TECHNICAL FIELD

This invention relates to label assemblies. In one of its aspects, the invention relates to redeemable coupons which are applied to product containers through pressure-sensitive adhesive and removed by the customer for redemption at the time of purchase of the product. In another, labels or tickets which can be applied to articles and removed as desired without leaving a sticky surface on the article or the label. In another of, articles having removable coatings. The invention relates to methods of making label.

BACKGROUND ART

It has long been the practice to provide redeemable coupons with goods such as food products and other commodities sold through food stores. The purpose of redeemable coupons is to promote the product and increase sales. The coupons are collected by the stores and returned to the product distributor for credit. Coupons have been printed on packages or otherwise incorporated in the packages. Examples of these types of redeemable coupons are disclosed in the following U.S. patents:

Duane, U.S. Pat. No. 814,592, issued Mar. 6, 1906;
Martin et al, U.S. Pat. No. 1,004,055, issued Sept. 26, 1911;
Wilson, U.S. Pat. No. 3,211,470, issued Oct. 12, 1965;
Otto, U.S. Pat. No. 4,306,367, issued Dec. 22, 1981.

In some cases these systems require the purchaser to consume the product or otherwise open the package and bring back the coupon for redemption. This two-step process is inconvenient and militates against the full value of the promotional program. In any case, these systems are limited to certain types of products with paper-stock wrappings and are not generally applicable to all types of containers, for example, plastic or glass bottles. Further, a special manufacturing process is required to produce these coupons. Thus, these coupons do not have the flexibility of selected programs in different parts of the country or for limited periods of time.

Pressure-sensitive labels are well known. It would seem evident that one could simply apply pressure-sensitive labels to containers and have customers simply peel off the labels and redeem them. However, the labels may be difficult to remove from certain types of packages unless the packages are coated with a release agent. Once again, coating of the packages requires a special manufacturing technique and may require precise placement of the coupon on the package. Further, the pressure-sensitive label, thus removed, would have a sticky backing which is undesirable not only from the consumer standpoint but from the handling of such coupons. Otherwise, the exposed adhesive might be left on the package which would be undesirable to the consumer.

Buske, in U.S. Pat. No. 3,524,782 (issued Aug. 18, 1970), discloses a removable coupon wherein a sheet has a pressure-sensitive adhesive on a back portion thereof and a coupon is adhered to the back portion of a sheet, leaving an exposed adhesive-containing portion of the sheet through which the sheet may be attached to a product container. The sheet has perforations which may be torn for access to the coupon beneath the outer sheet. The coupon can then be peeled from the back of the sheet. Although the coupon itself may not have a sticky coating, the sheet portions are sticky and present disposal problems.

Romagnoli, in U.S. Pat. No. 4,060,168 (issued Nov. 29, 1977), discloses labels having backing material with a die-cut portion opposed to the label which portion remains adhered to the label when the label is removed from the backing and applied to a container The label has adhesive on the back side through which the label is secured to the container. The label is removed from the container to expose the die-cut portion of the backing which may be used as a promotional item. The label back is sticky as in the Buske system and is generally of the same nature as Buske.

Hattemer, in U.S. Pat. No. 4,281,762 (issued Aug. 4, 1981), discloses a redeemable coupon in which base sheets have pressure-sensitive adhesive on the back side thereof and top sheets are positioned on the base sheet, coextensive therewith. The top sheets are adhered to the base sheets at the sides thereof, leaving the central portion thereof free from adhesive. Perforations are provided between the central portion and the side portions so that the central portion of the top sheet can be removed as a coupon. The removed coupon has no adhesive on the back side thereof and can be used as a redeemable coupon.

White, in U.S. Re. Pat. No. 30,958 (original issued Dec. 12, 1978), discloses a package label in which a label is secured at one portion thereof to a container and releasably secured at another portion thereof to the container. The second portion of the label can be separated from the first portion of the label and removed from the container. The label is not a redeemable coupon but rather is intended to be used as a dispensing and recording label for medicinal and pharmaceutical products.

Stipek, Jr., in U.S. Pat. No. 3,914,483 issued Oct. 21, 1975), discloses a double die-cut label in which an outer portion of a top sheet is adhesively secured to a container. An inner die-cut portion is removable from the top sheet and has a backing sheet thereon. The backing sheet may be removed to apply the inner die-cut portion to another structure. This label is intended for use as decorative labels and is not particularly applicable to in-store redeemable coupons.

Kennedy, Jr., in U.S. Pat. No. 3,420,364 (issued Jan. 7, 1969), discloses a strip of tags in which individual tags are mounted onto a backing strip through an adhesive layer. A lacquer coat and a release coating are interposed between the tag and the adhesive on the backing strip so that when the tag is removed from the backing strip, it has no adhesive on the back side thereof. The adhesive and the lacquer coating remain on the backing layer. The purpose of the adhesive on the tag is to facilitate handling of the tag during the manufacture, in printing and distribution of the tag. The tag is not designed to be adhesively secured to another surface.

DISCLOSURE OF INVENTION

According to the invention, there is provided a strip of removable coupons comprising an indefinite length of a web coated with a release coating and a plurality of separate coupons on the web. Each of the coupons has a sheet of stock material, a first dry coating layer covering a surface of the sheet of stock material and a second dry coating layer covering the first coating layer. A pressure-sensitive adhesive is applied over the second dry coating layer and adhesively secures the coupons to the web.

The first and second dry coatings are selected to be substantially incompatible with each other so that they separate from one another when the coupon, applied to an uncoated surface, such as a product container is pulled from the surface. However, the cohesive forces between the first and second coating layers are greater than the tensile strength between the pressure-sensitive layer and the web so that the coupons can be separated from the backing web and applied to containers or other articles. Thereafter, the coupons can be removed from the containers or other articles, leaving the adhesive layer and the second dry coating layer on the container or article. The container or article is thus free of a sticky surface and the coupons is also free of a sticky surface.

Preferably, one or both sides of the removable coupons have printing thereon. To this end, the first dry coating layer is a clear material, such as a clear varnish. Optionally, the second dry coating can have printing thereon between the second dry coating layer and the pressure-sensitive adhesive layers so that a message can be left on the product upon removal of the coupon. Typically, the second dry coating is a clear varnish.

The first and second dry coatings are selected so that they are substantially incompatible. Examples of the first dry coating are acrylic ester varnishes, polyamide varnishes and wax containing release compositions. Examples of the second dry coatings are acrylic ester varnishes and polyamide varnishes. Preferably, both coatings are clear but the coatings can be pigmented if desired. Obviously, if an acrylic ester varnish is selected for the first coating, the second coating will be other than the acrylic ester varnish. Likewise, if the first coating is a polyamide varnish, the second coating will be other than a polyamide varnish.

Also according, a ticket can be made of a sheet of stock material having a first dry substantially continuous coating layer covering a surface of the sheet, a dry substantially continuous varnish layer covering at least a portion of the coating layer wherein the first dry coating layer and the dry varnish layers are substantially incompatible so that they separate from each other by rubbing or pulling and the dry varnish layer is substantially free from sheet material covering the same. In the case of a lottery ticket, printed material is provided on the surface of the sheet beneath the first dry coating and a solid pigmented layer of the dry varnish type covers at least portions of the first coating layer, the solid pigmented layer being removable from the at least portions of the first coating layer by rubbing to expose the printed layer therebeneath.

The first coating layer and the dry varnish layer are selected so as to be incompatible with each other. Examples of incompatible systems are polyamide and acrylic ester varnishes and wax containing release compositions. Any combination of these three compositions will result in an incompatible system.

There is provided a process for producing a removable coupon label comprising the steps of coating a first coating on one side of an indefinite length of stock material, drying the first coating, coating a second coating on the first coating, and drying the second coating. The first and second coatings are substantially incompatible so that they can be separated from each other but remain together in the absence of tensile or rubbing forces therebetween. A pressure-sensitive adhesive layer and an indefinite length backing web are applied over the second coating. The backing web has a release coating thereon for the pressure-sensitive adhesive and is in contact with the pressure-sensitive adhesive. The cohesive forces between the pressure-sensitive adhesive and the backing web are less than the cohesive forces between the first and second dry coatings. The indefinite length of stock material is then die-cut to the backing web to form the coupons. Preferably, the excess indefinite length stock material is removed from the backing web to leave the coupons on the web. In one embodiment of the invention, a printed or pigmented layer is provided on the one side of the stock material prior to the first coating step. Alternatively, and in addition to the printing on one side of the stock material, printing can be provided at any point on the uncoated side of the stock material. The first and second coatings are substantially incompatible and can comprise the incompatible systems discussed above.

Further according to the invention, there is provided a process for producing a ticket with a removable surface coating comprising printing on a first surface of a sheet of stock material, applying a first coating to the printed surface of the stock material, drying the first coating and applying a pigmented varnish coating over at least portions of the first dry coating. The first dry coating and the pigmented varnish are substantially incompatible so that they separate from each other by rubbing or scratching but yet otherwise remain intact. The first dry coating can be of a material selected from the group of acrylic ester varnishes, polyamide varnishes and wax compositions. The pigmented varnish coating can be selected from the group consisting of polyamide varnishes and acrylic ester varnishes. In order to maintain incompatibility, both the first coating and the pigmented varnish layers are not of the same.

The invention provides an economical, lottery ticket which is easily produced, without having a sticky surface or without leaving a sticky surface on the product container. The invention further provides an economical process for producing a redeemable coupon and for producing. The invention achieves these desirable features with a single ply of stock material and a carrier web with a minimum of processing steps. The coatings are relatively inexpensive and are inexpensively applied in a conventional manner.

BRIEF DESCRIPTION OF THE DRAWINGS

The invention will now be described with reference to the accompanying drawings in which.

BEST MODE FOR CARRYING OUT THE INVENTION

Figure 1:
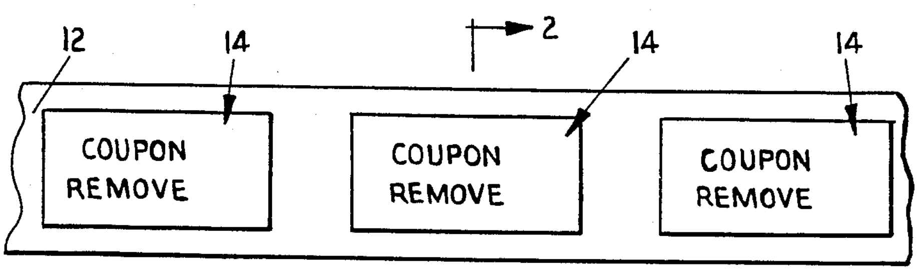
FIG. 1 is a perspective view of a coupon according to the invention on a coated backing web.
Figure 2:
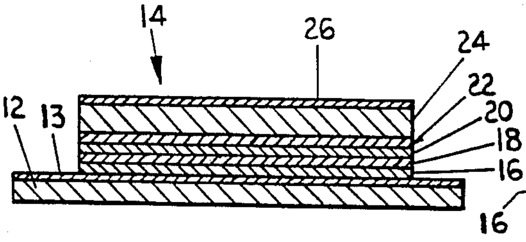
FIG. 2 is an enlarged sectional view seen along lines 2—2 of FIG. 1.

Referring now to the drawings, and to FIGS. 1 and 2 in particular, there is shown a removable coupon 14 on a coated backing web 12. The backing web 12 is a conventional paper stock, for example, coated with a release coating 13, such as a silicone or wax composition.

The coupon 14 comprises an adhesive layer 16 through which the coupon is secured to the backing web 12, a second varnish layer 18 which coats the adhesive layer 16, a first varnish layer 20 which coats the second varnish layer 18 and a paper stock layer 24 which can have a pigmented layer 22 on the underside thereof and a pigmented layer 26 on the top side thereof. The 25 pigmented layers 22 and 26 typically comprise printing. The adhesive layer 16 can be complete or partial, or can be patterned for ease of removal.

The first and second varnish layers are typically clear, although they can be pigmented if desired. However, the first and second varnish layers are incompatible with each other so that they have very low tensile strength but have a certain degree of shear strength therebetween.

Figure 3:
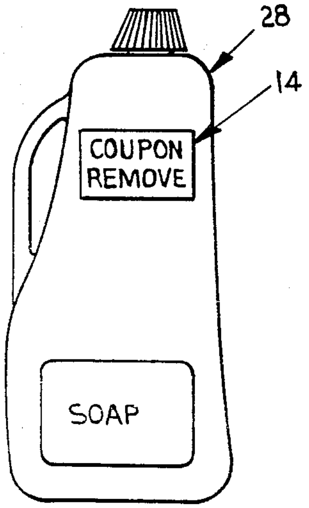
FIG. 3 shows the coupon according to the invention on a product container.
Figure 4:
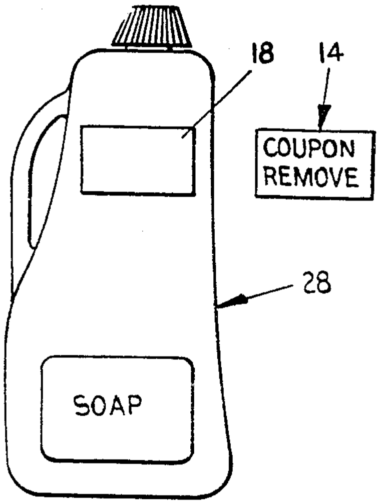
FIG. 4 shows the coupon removed from the product container.

The adhesive layer 16 is firmly secured to the second varnish layer 18 so that the coupon separates from the coated backing web 12 at the adhesive layer. As illustrated in FIG. 3, the coupon is typically applied to a product container 28 with the adhesive layer 16 of the coupon firmly secured to the outer surface of the container 28. The product container is then sold to the customer with the coupon 14 attached thereto. The customer will remove the coupon from the container 28. The coupon separates between the first and second varnish layers 20 and 18, respectively, due to the incompatibility of these two layers, thereby leaving the second varnish layer 18 on the container 28, covering the adhesive layer 16. Thus, when one touches the container 18 where the coupon was located, it is not sticky because the adhesive layer 16 is covered by the second varnish layer 18. Further, the obverse side of the coupon 14 is not sticky because the first varnish layer 20 presents a smooth, nonsticky surface. The customer will typically redeem the coupon 14.

Figure 5:
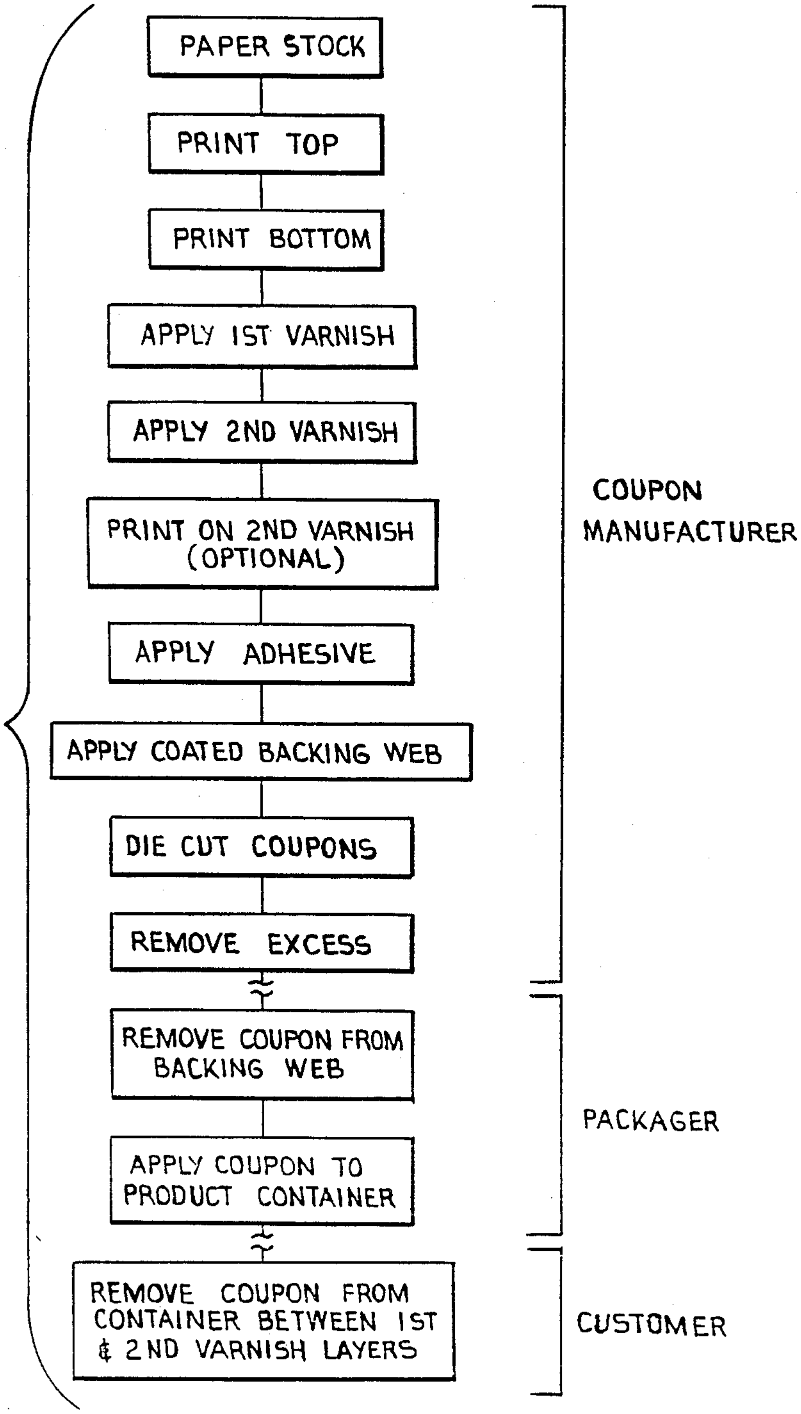
FIG. 5 is a flow chart of the process for making the coupon according to the invention.

The process for making the coupon is illustrated in FIG. 5, to which reference is now made. A conventional paper stock is printed on top and bottom in conventional fashion. A first varnish is applied to the printing on the bottom of the paper stock and a second varnish is applied to the first varnish. Optionally, a reverse printing operation can be carried out on the second varnish if a message is desired to be left on the container. The adhesive is then applied to the reverse printed or second varnish layer and the paper stock is then applied to a release coated backing web. The paper stock is then die-cut down to the backing web to cut the coupons. Any shape coupons can be cut with the die in conventional fashion. The excess paper stock is thereafter removed from the backing web, leaving the coupons as illustrated in FIGS. 1 and 2 on the backing web 12. The backing web with the coupons would typically be rolled up and shipped to a customer which packages the product container. The coupons would be stripped from the backing web in conventional fashion and applied to the product container. As mentioned above, the adhesive is easily released from the coated backing web so that the entire coupon assembly can be easily stripped from the backing web and applied to the product container. The product container is then shipped to a distribution center where it is purchased by the customer. The customer, upon purchasing the product, will remove the coupon from the container with the coupon separating between the first and second varnish layers. The coupon is then redeemed by the customer.

Figure 6:
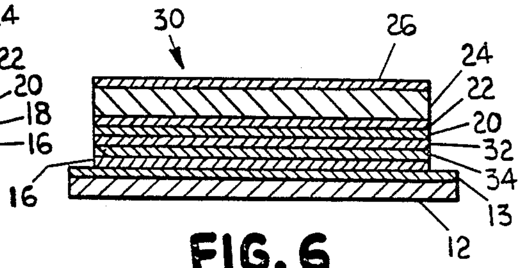
FIG. 6 is a modified form of the invention embodied in a rub-off lottery ticket.

Reference is now made to FIG. 6 which shows an alternate embodiment of the invention in which the coupon can be used as an instant lottery ticket. Like numerals have been used to describe like elements.

The lottery ticket 30 comprises a paper stock layer 24 having a pigmented layer 26 (printing) on the top side and a pigmented layer 22 (printing) on the bottom side. The pigmented layer 22 contains the lottery information (such as a number series). A first varnish layer 20 which would be a clear varnish layer covers the pigmented layer 22. A silver or other pigmented layer 32 is coated over the first varnish 20. The silver or other pigmented layer is in a vehicle of the second varnish type. The layer 32 can be formed of a partial pigmented coating and a clear varnish coating or can be fully pigmented. The layer 32 can be formed in one step or two steps, if there is only partial pigmentation. A third varnish layer 34, similar in composition to the first varnish layer 20, is then coated over the pigmented or silver layer 32. An adhesive layer 16 is coated over the varnish layer 34 and secures the coupon to a backing web 12 having a release coating 13. The backing web 12 is used for handling of the tickets during processing and distribution. The tickets are peeled from the backing layer so that the ticket separates between the adhesive layer 16 and the release coating 13. The tickets can be applied to product containers like the coupons or to a card for sale. Ultimately, the purchaser removes the ticket from the product, with the separation taking place between the third varnish layer 34 and the silver or pigmented layer 32.

The purchaser will scrape off the pigmented layer 32. Because the pigmented layer 32 is incompatible with the first varnish layer 20, the pigmented layer 32 will be easily removed, thereby exposing the printed layer 22.

The process for producing the lottery ticket 30 is substantially the same as the process for producing the coupon 14 as illustrated in FIG. 5 except that the silver or pigmented layer 32 is applied in lieu of the second varnish, the step of applying the third varnish does not take place and the step of printing on the second varnish is not carried out.

Figure 7:
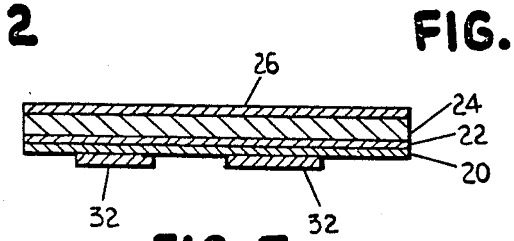
FIG. 7 is a modified form of a lottery ticket according to the invention.

A more conventional lottery ticket is illustrated in FIG. 7 to which reference is now made and wherein like numerals have been used to indicate like elements. The lottery ticket has a paper stock layer with a pigmented layer 26 (printing) on the top surface and a pigmented layer 22 (printing) on the bottom surface thereof. A first varnish layer 20 covers the printing. A silver or pigmented layer 32 partially covers the first varnish layer 20 so as to obscure part of the printing on the pigmented layer 22. The obscured portion can be the numbers or symbols which form the lottery combination. The tickets can be printed and processed in sheet form and severed in conventional fashion to form the tickets. Thus, the tickets shown in FIG. 7 do not require a backing layer. The partial layer 32 can be applied by silk screening.

The first and second varnishes can be any varnish systems which are incompatible with one another. The varnishes must have sufficient shear strength so that they remain adhered together when the coupon is pulled from the backing strip. Thus, the tensile strength between the two varnish systems must be greater than the tensile strength between the adhesive layer 16 and the coated backing web 12. An example of a typical two-varnish system is a polyamide varnish and an acrylate ester varnish which can be used as the first varnish. A suitable polyamide varnish is sold under the trade name Flexo Polyamide by Inmont Corporation, United Technical Corporation of Clifton, N.J. Another suitable polyamide varnish is sold under the trade name of Propalin Varnish by Gotham Ink and Color Company of Long Island, N.Y. A suitable acrylate ester varnish is sold under the trade name Rayvex Clear Coat AD-29 by Cellofilm Corporation of Woodridge, N.J.

Acrylic esters generally suitable as varnishes are disclosed in the Brack U.S. Pat. No. 3,989,609 (issued Nov. 2, 1976), Carder U.S. Pat. No. 4,003,751 (issued Jan. 18, 1977), Nordstrom U.S. Pat. No. 3,479,328 (issued Nov. 18, 1969) and Nordstrom U.S. Pat. No. 3,674,838 (issued July 4, 1972). The acrylic ester compositions disclosed in these patents are believed to be representative of the acrylate ester varnishes which can be used as one component in the twovarnish system according to the invention.

Polyamide compositions generally suitable as varnish c are disclosed in the Brack U.S. Pat. No. 3,989,609 and in the Blum U.S. Pat. No. 3,978,274 (issued Aug. 31, 1976). The polyamide compositions disclosed in these patents are believed to be representative of the polyamide varnishes which can be used as one component in the two-varnish system according to the invention.

The relative positions of the first and second varnishes in the coupon or lottery ticket according to the invention are interchangeable so that the acrylate ester varnish can be used as a second varnish and the polyamide varnish can be used as the first varnish. The significant feature is that the two varnishes are incompatible with one another and that they separate from each other when the coupon is removed from the product container.

Another system which can be used is a wax base composition used as the first varnish and either the polyamide or the acrylate ester or any other varnish used as the second varnish. Any suitable wax release composition can be used as the first varnish layer. An example of a suitable wax composition is disclosed in U.S Pat. No. 3,420,364. The lacquer composition disclosed in U.S. Pat. No. 3,420,364 can be used as the second varnish in a system with the wax composition.

Whereas the invention has been described with reference to redeemable coupons and lottery tickets, the invention also find use in warranty cards, proof-of-purchase seals, proof- of-delivery cards and inventory-control labels. The labels can be removable as a unit or can be segmented for partial removal from the goods. In summary, the invention can be used for any product which is temporarily attached to a backing surface.

The invention has been described with reference to spaced coupons on a backing web. The invention can also be carried out with the paper stock layer 24 and the backing web 12 co-extensive. All layers therebetween would also be co-extensive. This embodiment can be made by the process described in FIG. 5 by simply eliminating the die cut and removal of excess steps.

EXAMPLE

A paper stock was printed on both sides. The back side of the printed stock was first coated with a polyamide varnish sold by Inmont Corporation under the trade name Flexo Polyamide. A second coating of an acrylic ester varnish sold under the trade name Rayvex Clear Coat AD-29 by Cellofilm Corporation was coated over the polyamide varnish. The thus-coated paper stock was applied to a pressure-sensitive adhesive-coated web of indefinite length to laminate the paper stock to the coated web. The paper stock was then die-cut down to the coated web to form rectangular labels. The excess paper stock was then removed. The labels were then selectively removed from the web with the pressure-sensitive adhesive layer being released from the web and adhering to the labels. The labels were applied to articles and then peeled from the articles. Upon peeling the labels from the articles, the acrylic ester varnish, although clear, visibly remained with the adhesive on the article and there was no sticky surface left on the article. Likewise, the label was not sticky.

Reasonable variation and modification are possible within the scope of the foregoing disclosure and drawings without departing from the spirit of the claims.

The embodiments of the invention in which an exclusive property or privilege is claimed are defined as follows:

1. A coupon or ticket comprising:

a sheet of stock material having a first dry substantially continuous coating layer of a material selected from the group consisting of polyamide varnishes, acrylic ester varnishes and wax composition covering a surface of said sheet and a second coating lager of a dry substantially continuous varnish covering at least a portion of said first coating layer;

said first dry coating layer and said second dry coating layer being substantially incompatible with each other so that the first and second coating layers separate from each other by rubbing or pulling apart, and said second coating layer being free from any sheet material covering the same;

a layer of printing on said surface of said sheet beneath said first dry coating;

at least portions of said second coating lager being opaque pigmented and covering at least portions of said first coating layer, said pigmented second coating layer being removable from said at least portions of said first coating by rubbing to expose said printed layer therebeneath.

2. A coupon or ticket according to claim 1 wherein said second coating lager of dry varnish is selected from the group consisting of polyamide and acrylic ester varnishes and wax containing release compositions.

3. A coupon or ticket according to claim 1 and further comprising a layer of pressure-sensitive adhesive covering said dry varnish layer.

4. A coupon or ticket comprising:

a sheet of stock material having a first dry substantially continuous coating layer covering a surface of said sheet and a second coating of a dry substantially continuous varnish selected from the group consisting of polyamide and acrylic ester varnishes and wax containing release compositions and covering at least a portion of said first coating layer;

said first dry coating layer and said second coating layer of dry varnish being substantially incompatible with each other so that the first and second lagers separate from each other by rubbing or pulling apart, and said second coating layer being free from any sheet material covering the same;

a layer of printing on said surface of said sheet beneath said first dry coating;

at least portions of said second coating layer being opaque pigmented and covering at least portions of said first coating layer, said pigmented second coating layer being removable from said at least portions of said first coating by rubbing to expose said printed layer therebeneath.

5. A coupon or ticket according to claim 4 wherein said first dry coating layer is a polyamide varnish.

6. A coupon or ticket according to claim 5 wherein said second coating layer is an acrylic ester varnish.

7. A coupon or ticket according to claim 4 wherein said first dry coating layer is an acrylic ester varnish.

8. A coupon or ticket according to claim 7 wherein said second coating layer is an acrylic ester varnish.

* * * * *

UNITED STATES PATENT AND TRADEMARK OFFICE
CERTIFICATE OF CORRECTION

PATENT NO. : 4,872,707

DATED : October 10, 1989

INVENTOR(S) : Frank G. deBruin

It is certified that error appears in the above-identified patent and that said Letters Patent is hereby corrected as shown below:

Claim 1, column 8, lines 29 and 30, "composition" should be --compositions--.

Claim 1, column 8, line 42, "lager" should be --layer--.

Claim 2, column 8, line 49, "lager" should be --layer--.

Claim 4, column 8, line 66, "lager" should be --layer--.

Signed and Sealed this

Nineteenth Day of November, 1991

*Attest:*

HARRY F. MANBECK, JR.

*Attesting Officer*

*Commissioner of Patents and Trademarks*